United States Patent
Ollearo

[15] 3,640,397
[45] Feb. 8, 1972

[54] TOOLHOLDER FOR MACHINE TOOLS
[72] Inventor: Giorgio Ollearo, Ivrea, Italy
[73] Assignee: Ing. C. Olivetti & C., S.p.A., Ivrea Turin, Italy
[22] Filed: Dec. 31, 1969
[21] Appl. No.: 889,571

[30] Foreign Application Priority Data
Jan. 28, 1969 Italy..................50322 A/69

[52] U.S. Cl. ...................................................211/1.5
[51] Int. Cl. ......................................................A47f 3/08
[58] Field of Search..............211/1.5, 60 T; 29/568, 26; 279/1, 1 A, 9, 1 B, 83

[56] References Cited
UNITED STATES PATENTS

| | | | |
|---|---|---|---|
| 1,623,705 | 4/1927 | Sauveur | 279/59 |
| 2,828,131 | 3/1958 | Appleby | 279/16 |
| 3,052,999 | 9/1962 | Sedgwick | 40/2.2 |
| 3,191,260 | 6/1965 | Jorgensen | 29/26 |
| 3,425,717 | 2/1969 | Bruce | 285/153 |
| 3,484,114 | 12/1969 | Rodin | 279/1 |

*Primary Examiner*—Nile C. Byers, Jr.
*Attorney*—Birch, Swindler, McKie & Beckett

[57] ABSTRACT

In a machine tool having a rotatable chuck and tool magazine drum, each tool holder is provided with a protective tube concentric with the shank of the tool holder. The chuck and each compartment of the magazine drum are provided with an annular recess. The tube is housed in the recess when the toolholder is placed in the compartment or chuck housing, creating a labyrinth which prevents the shank from dirtying during operation. The recess of the chick is also provided with packing, sealing the tube and the recess.

3 Claims, 2 Drawing Figures

INVENTOR
GIORGIO OLLEARO

TOOLHOLDER FOR MACHINE TOOLS

The present invention relates to an improved toolholder for machine tools in which the toolholder includes a coupling shank adapted to be housed in a corresponding seat of a coupling of the machine, and to a machine tool for use with the toolholder.

Various toolholders of the aforesaid type for machine tools are known in which a conical shank is adapted to be housed in a coupling seat of a toolholder magazine or a chuck. These generally include a flange adapted to be engaged by a tool-changing member.

Both during the changing of the tool and during the machining process, foreign bodies such as dust, swarf and cutting oil are thrown on to the shank of the toolholder and cause faulty mating of the latter in the seat and this then has repercussions on the precision of the machining.

In order to overcome this problem, according to the invention there is provided a toolholder for a machine tool in which the toolholder includes a coupling shank adapted to be housed in a corresponding seat of a coupling of the machine, and a flange fixed to the shank carries a protective tube adapted to be housed in an annular recess concentric with the coupling seat.

Figure 1:
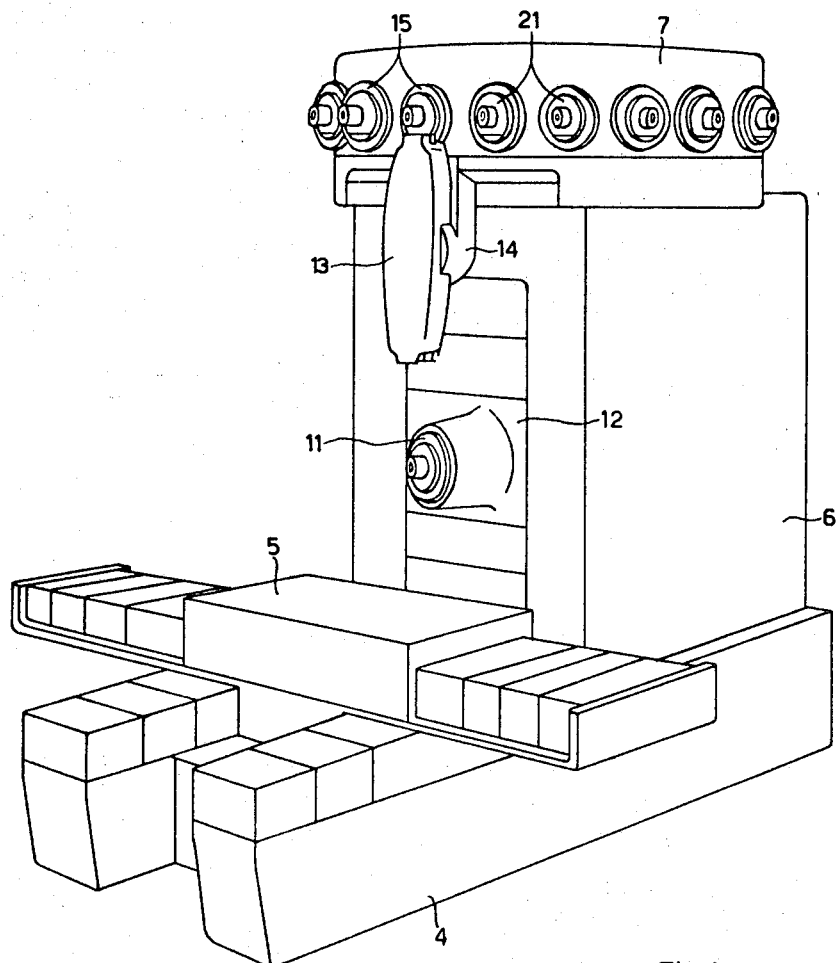
Figure 2:
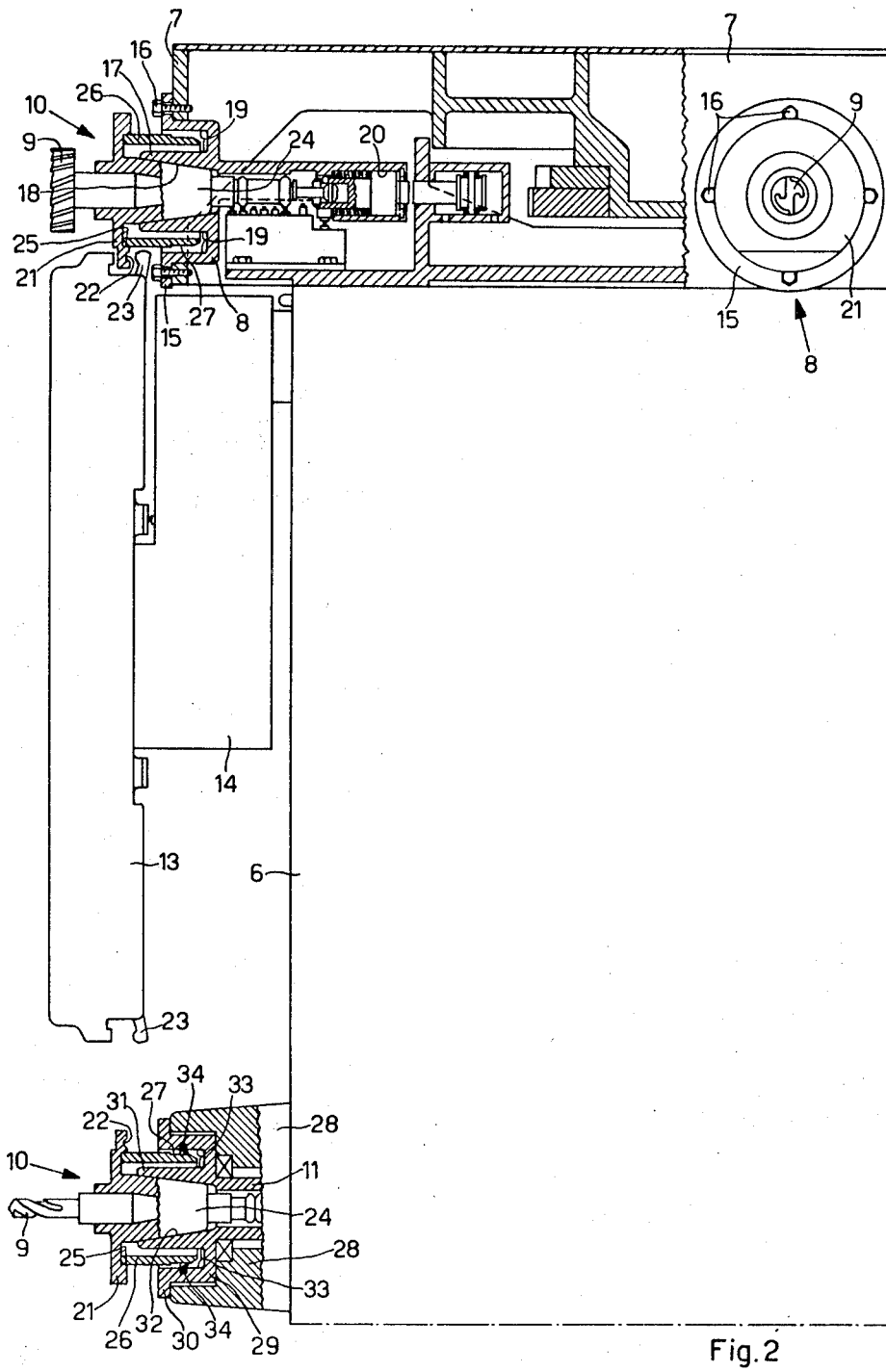

The invention will be described in more detail, by way of example, with reference to the accompanying drawings, in which:

FIG. 1 is a front perspective view from the right of a machine tool in which the tools are changed automatically and which incorporates a toolholder embodying the invention, and FIG. 2 is a partial view of the machine from the right, in which some of the parts are shown in section.

Referring to FIG. 1, the machine tool comprises a base 4, on which is mounted a workpiece-carrying table 5, and an upright or standard 6, on which is mounted a toolholder magazine constituted by a cylindrical drum 7. The drum is rotatable about a vertical axis and has at its periphery a series of compartments 8 (FIG. 2) which are disposed radially and each of which houses a tool 9 fixed to a toolholder indicated generally by the reference 10.

On the standard 6 there is moreover arranged a chuck 11 (FIG. 1) carried by a headstock 12 and rotatable about a horizontal axis. A tool-changing arm 13 is mounted rotatably on a support 14 which, in turn is slidable longitudinally with respect to the standard 6 for exchanging the tool in the chuck 11 for a tool selected from the drum 7.

Referring to FIG. 2, each compartment 8 includes an external flange 15 fixed to the drum 7 by means of four bolts 16. Moreover, each compartment 8 includes an externally cylindrical boss 17 which has a conical seat 18 internally. Between the flange 15 and the cylindrical portion 17 there is a deep annular recess 19 concentric with the seat 18. The seat 18 extends towards the center of the drum 7 in the form of a cylindrical hollow portion 20. This contains mechanism for releasably retaining the toolholder in the drum and for ejecting the tool when it is selected but the mechanism is not described as, like the functioning of the arm 13, it is known per se.

Each toolholder 10 includes a circular flange 21 provided with a notch 22 adapted to cooperate with a jaw 23 of the tool-changing arm 13, and a conical shank 24 adapted to be housed in the seat 18 of the compartment 8. The flange 21 has a cylindrical recess 25 in which there is fixed a protective shield or tube 26 of cylindrical form. The tube 26 is adapted to be housed in the recess 19 in the compartment 8. The end of the tube 26 has a machined cylindrical portion 27 of slightly smaller diameter.

The chuck 11 is mounted in a nonrotatable housing 28 and has a hollow terminal portion 29. This portion has a cylindrical external flange 30 which rotates with a small clearance adjacent the terminal portion of the housing 28. The portion 29 moreover includes an externally cylindrical boss 31 having internally a conical seat 32 adapted to receive the shank 24 of the toolholder 10. Between the flange 30 and the portion 31 there is a deep annular recess 33 concentric with the seat 32. The tube 26 of the toolholder 10 can be housed in the recess 33. In the recess 33 there is moreover formed an annular groove in which there is seated a packing 34 adapted to cooperate with the machined cylindrical portion 27 at the free end of the tube 26 which has a diameter slightly smaller than the remainder of the tube.

In the drum 7, it is practically impossible for dirt to be deposited on the conical shank 24, due to the labyrinth which is created between the protective tube 26 and the recess 19. In this way, fouling of the surfaces of the shank 24 and the seat 18 is prevented.

During the machining of a workpiece, the tool 9 mounted in the chuck 11 is continuously cooled with cutting oil. Notwithstanding the customary protective shields or guards, both the oil and the swarf are thrown over the whole of the machine and in particular on to the flange 21. The dirt and swarf cannot, however, be deposited on the shank due to the labyrinth between the tube 26 and the recess 33, while the oil and the impurities in suspension are stopped by the packing 34. In this way, fouling of the shank 24 in the chuck and of the seat 32 is also prevented.

It is therefore clear that the flange 21 fixed to the shank 24 carries a protective tube 26 adapted to be housed in the annular recesses 19 and 33 concentric with the seats 18 and 32, respectively.

What we claim is:

1. In a machine tool including a rotatable chuck, a magazine adapted to carry a plurality of tools each one secured to a toolholder, and means for automatically mounting a selected toolholder on said chuck, said toolholder comprising a circular flange and a coupling shank protruding from said flange in a direction opposite to the carried tool and adapted to be housed in a coupling seat carried by a first boss portion of said chuck, the improvement comprising:

a protective tube fixed on said toolholder flange adjacent and coaxial with said shank, and a second boss portion integral with said first boss portion of said chuck and concentric therewith to form an annular recess adapted to be entered by said tube with a relatively small clearance, whereby a labyrinth formed between said tube and said recess prevents said shank from dirtying.

2. A machine tool as claimed in claim 1, wherein said magazine is movable to bring a selected one of said plurality of toolholders to a tool changing station, and includes a plurality of compartments, each of said compartments comprising a first boss part for housing the shank of a toolholder, and a second boss part integral with the first magazine boss part and concentric therewith to form a second annular recess adapted to be entered by the tube of said toolholder with a relatively small clearance.

3. A machine tool as claimed in claim 1 including packing in said annular recess of said chuck cooperating with a portion of said tube to seal the labyrinth against oil penetration.

* * * * *